(12) United States Patent
Nykerk et al.

(10) Patent No.: US 10,753,579 B2
(45) Date of Patent: Aug. 25, 2020

(54) ANIMATED 3D IMAGE MULTIPLIER

(71) Applicant: Flex-N-Gate Advanced Product Development, LLC, Tecumseh (CA)

(72) Inventors: Todd Nykerk, Holland, MI (US); Les Sullivan, Wyoming, MI (US)

(73) Assignee: Flex-N-Gate Advanced Product Development, LLC, Tecumseh (CA)

( * ) Notice: Subject to any disclaimer, the term of this patent is extended or adjusted under 35 U.S.C. 154(b) by 0 days.

(21) Appl. No.: 16/516,705

(22) Filed: Jul. 19, 2019

(65) Prior Publication Data
US 2020/0025354 A1 Jan. 23, 2020

Related U.S. Application Data

(60) Provisional application No. 62/701,041, filed on Jul. 20, 2018.

(51) Int. Cl.
*F21V 13/12* (2006.01)
*F21V 11/00* (2015.01)
*F21V 5/00* (2018.01)
F21W 121/00 (2006.01)
F21Y 115/10 (2016.01)

(52) U.S. Cl.
CPC ........... *F21V 13/12* (2013.01); *F21V 5/008* (2013.01); *F21V 11/00* (2013.01); *F21W 2121/00* (2013.01); *F21Y 2115/10* (2016.08)

(58) Field of Classification Search
CPC .................................. F21V 13/12; F21V 5/008
See application file for complete search history.

(56) References Cited

U.S. PATENT DOCUMENTS 9,989,920 B2    6/2018  Schwerdtner
10,006,600 B2   6/2018  Jo et al.
(Continued)

FOREIGN PATENT DOCUMENTS

CN    202188326 U    4/2012
WO    2016191321 A1  12/2016

OTHER PUBLICATIONS

PCT Patent Application PCT/US2019/042544 International Search Report and Written Opinion dated Oct. 31, 2019.
(Continued)

*Primary Examiner* — Evan P Dzierzynski
(74) *Attorney, Agent, or Firm* — Erise IP, P.A.

(57) ABSTRACT

An animated 3D image multiplying light assembly includes a light source having a plurality of light-emitting diodes. A mask is disposed at a predetermined distance from the light source, and a plurality of holes are adapted to allow light to pass through the mask. The mask includes more holes than the number of light-emitting diodes. A first lenticular sheet is adjacent a second lenticular sheet for projecting light from the light source having passed through the mask. The first lenticular sheet is aligned perpendicular with the second lenticular sheet for homogenizing light in a first direction and a second direction, perpendicular to the first direction. An outer lens is positioned such that light projected from the first lenticular sheet and the second lenticular sheet appears as though positioned at different depths with respect to the outer lens, providing a 3D appearance. When viewed dynamically, the light projected appears to move.

14 Claims, 1 Drawing Sheet

(56) References Cited

U.S. PATENT DOCUMENTS

| | | |
|---|---|---|
| 2003/0058209 A1 | 3/2003 | Balogh |
| 2010/0007636 A1 | 1/2010 | Tomisawa et al. |
| 2011/0234770 A1 | 9/2011 | Zerrouk et al. |
| 2011/0304895 A1 | 12/2011 | Schwerdtner |
| 2013/0128230 A1 | 5/2013 | Macnamara |
| 2014/0133128 A1 | 5/2014 | Oh |
| 2016/0320627 A1* | 11/2016 | Chen ................... G02B 5/1823 |
| 2016/0363288 A1* | 12/2016 | McKendry .............. F21V 5/045 |
| 2017/0261758 A1 | 9/2017 | Powell |
| 2017/0285406 A1* | 10/2017 | Azuma ............ G02F 1/133606 |
| 2017/0314759 A1 | 11/2017 | Nykerk et al. |
| 2018/0274745 A1 | 9/2018 | Nykerk et al. |
| 2019/0265522 A1* | 8/2019 | Chen ................... G02F 1/13363 |

OTHER PUBLICATIONS

PCT Patent Application PCT/US2018/059750 International Search Report and Written Opinion dated Mar. 21, 2019.
PCT Patent Application PCT/US2019/042590 International Search Report and Written Opinion dated Oct. 31, 2019.

\* cited by examiner

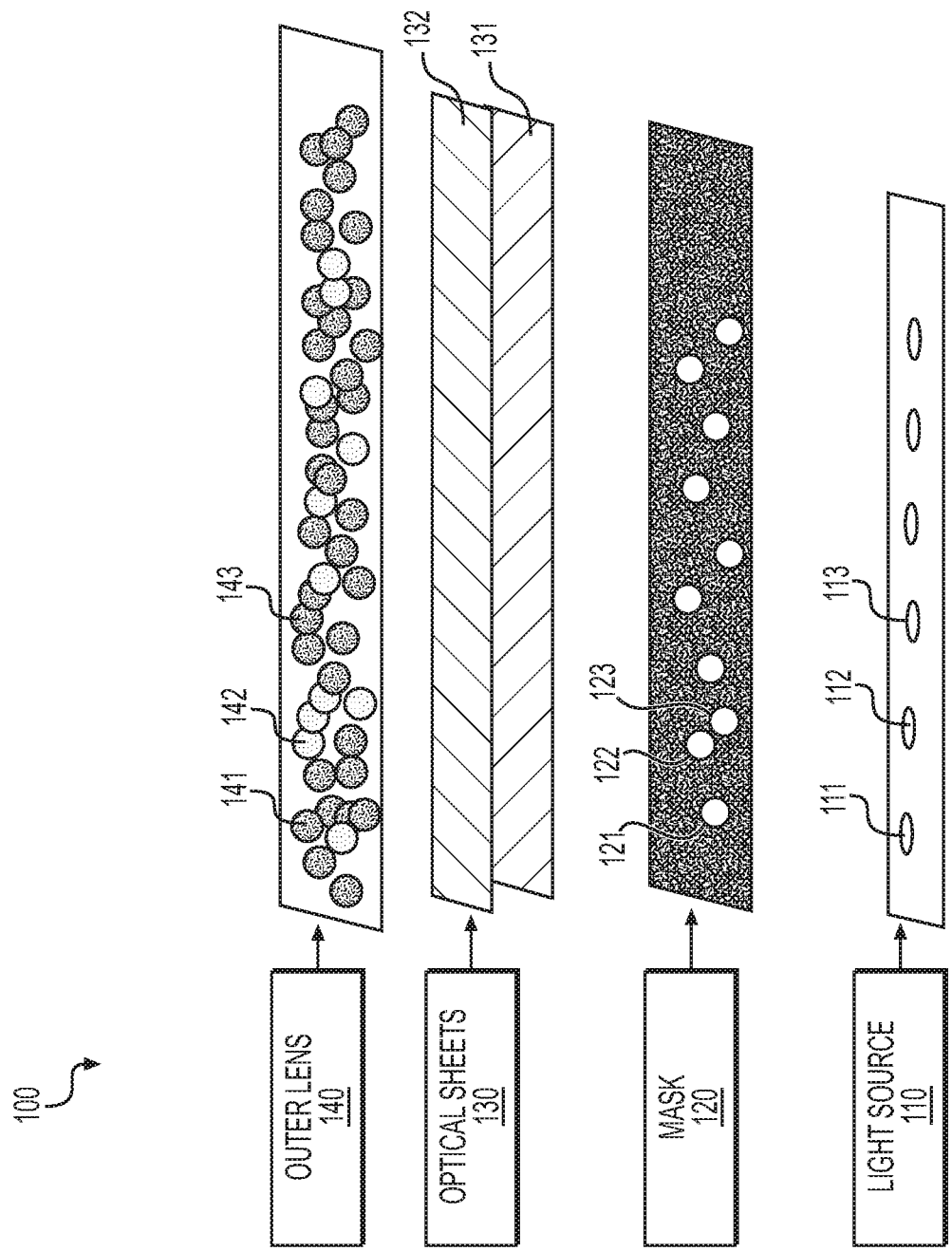

ANIMATED 3D IMAGE MULTIPLIER

CROSS-REFERENCE TO RELATED APPLICATIONS

This application claims the benefit of U.S. Provisional Application No. 62/701,041 entitled "Animated 3D Image Multiplier" and filed on Jul. 20, 2018, which is herein incorporated by reference in its entirety.

BACKGROUND

1. Field

Embodiments of this disclosure are in the field of lighting displays. More specifically, embodiments of this disclosure provide images that appear animated when viewed dynamically.

2. Description of the Related Art

None.

SUMMARY

In an embodiment, an animated 3D image multiplier includes a light source having a plurality of lights. A mask, disposed adjacent the light source, has a plurality of holes that enable light from the light source to pass through the mask. A plurality of optical sheets are disposed adjacent the mask, opposite the light source, for projecting light passing through the mask. An outer lens is disposed adjacent the plurality of optical sheets, opposite the mask, such that light projected from the plurality of optical sheets appears to be positioned at different depths with respect to the outer lens.

In another embodiment, an animated 3D image multiplying light assembly includes a light source having a plurality of light-emitting diodes. A mask is disposed at a predetermined distance from the light source. A plurality of holes are adapted to allow light to pass through the mask. The mask includes more holes than the number of light-emitting diodes. A first lenticular sheet is adjacent a second lenticular sheet for projecting light from the light source having passed through the mask. The first lenticular sheet is aligned perpendicular with the second lenticular sheet for homogenizing light in a first direction and a second direction, perpendicular to the first direction. An outer lens is positioned such that light projected from the first lenticular sheet and the second lenticular sheet appears as though positioned at different depths with respect to the outer lens, providing a 3D appearance. When viewed dynamically, the light projected appears to move dynamically.

BRIEF DESCRIPTION OF THE DRAWINGS

Illustrative embodiments of the present disclosure are described in detail below with reference to the attached drawing FIGURE, which are incorporated by reference herein and wherein:

FIG. 1 shows an exploded view of an animated three-dimensional (3D) image multiplier, in an embodiment.

The drawing FIGURE do not limit the invention to the specific embodiments disclosed and described herein. The drawings are not necessarily to scale, emphasis instead being placed upon clearly illustrating the principles the disclosure.

DETAILED DESCRIPTION

In certain lighting applications, an appearance of three-dimensional (3D) depth (e.g., in front of a lighting device) may be used to produce desired lighting effects. Traditionally, 3D images are generated using stereoscopic imaging methods involving interlaced images that are offset to one another for viewing separately by the left and right eye of a viewer. The images are then combined in the viewer's brain to give the perception of 3D depth. Embodiments of the present disclosure provide a way to create patterns of light that appear to have a three-dimensional quality without using interlaced images. Embodiments of the present disclosure also provide an appearance that the patterns of light are animated as the viewer's perspective changes.

FIG. 1 shows an exploded view of an exemplary animated 3D image multiplier 100. A light source 110 is positioned beneath a mask 120. In some embodiments, light source 110 includes a plurality of light-emitting diodes (LEDs) mounted on a printed-circuit board (PCB). For example, as depicted in FIG. 1, light source includes a first LED 111, a second LED 112, a third LED 113, etc. Not all LEDs are enumerated for clarity of illustration. Each of the individual LEDs may be independently lit and unlit via a controller (not shown) that is electrically and communicatively coupled with the PCB. The LEDs may be all of one type or of a plurality of sizes, colors, and/or intensities. In some embodiments, the LEDs have a cone angle that is about 120-degrees wide.

Mask 120 blocks portions of light emitted from light source 110, while allowing other portions of emitted light to pass through, thereby forming a pattern of emitted light. In certain embodiments, mask 120 has a dark color for blocking light and a plurality of holes for enabling some light to shine through. For example, as depicted in FIG. 1, mask 120 includes a first hole 121, a second hole 122, a third hole 123, etc. Not all of the depicted holes are enumerated for clarity of illustration. The plurality of holes may have one or more shapes (e.g., circles, ovals, squares, triangles, etc.). In some embodiments, there are a greater number of holes in mask 120 compared to the number of LEDs in light source 110.

A plurality of optical sheets 130 are adapted to homogenize light emitted through mask 120. In certain embodiments, optical sheets 130 includes a first optical sheet 131 and a second optical sheet 132, as depicted in FIG. 1. In some embodiments, first and second optical sheets 131, 132 are lenticular sheets, which are optically clear sheets made of plastic with a lenticular pattern molded into one side and a flat surface on the opposite side. The lenticular pattern is an array of light-modifying elements, such as an array of convex lenses that focus light according to a particular prescription. The lenticular pattern may be aligned in a particular direction throughout a respective sheet. In some embodiments, first optical sheet 131 is arranged with its lenticular pattern perpendicular to that of second optical sheet 132 for homogenizing light in a first direction and a second direction perpendicular to the first direction (e.g., both horizontally and vertically).

An outer lens 140 is disposed adjacent an outer side (i.e., opposite mask 120) of optical sheets 130. Outer lens 140 may be made of a transparent material adapted to protect optical sheets 130 from outside elements while allowing light to pass through. In certain embodiments, animated 3D image multiplier 100 is integrated within a lamp assembly (e.g., of a vehicle). The light source 110, mask 120, optical sheets 130, and outer lens 140 may be structurally supported and held in alignment with one another via a housing (not shown) of the lamp assembly. In some embodiments, outer lens 140, optical sheets 130, and mask 120 are aligned substantially adjacent to one another (e.g., touching one another), whereas a predetermined gap exists between light source 110 and mask 120. The predetermined gap is based on characteristics of the LEDs of light source 110 (e.g., the number of LEDs, their size, intensity, and cone angle), the size and shape of the holes in mask 120, and a desired effect on the images formed on outer lens 140.

In operation, individual LEDs of light source 110 emit light that shines through a plurality of holes in mask 120, which form a light pattern that projects onto optical sheets 130. First and second optical sheets 131, 132 homogenize the light and project the light pattern onto outer lens 140. Light from a single LED appears to be multiplied as it shines through a plurality of holes of mask 120 to form a plurality of images on outer lens 140. An intensity of light among the plurality of images differs based on a path that the light takes through mask 120, forming a pattern of varied-intensity light. Light from an individual LED passes through the plurality of holes in mask 120 at a corresponding plurality of angles. The angle at which light passes through a particular hole affects the spread of light as it passes through that particular hole. For example, a hole directly over a LED will produce a focused image, whereas a hole of the same shape but located further from the LED will produce an elongated and less intense image. The plurality of holes receive light from a particular LED at varying angles causing varying spreads of light which leads to varying intensity projections of light (e.g., images) on outer lens 140.

For example, as depicted in FIG. 1, a first image 141, a second image 142, and a third image 143 are projected onto outer lens 140 with different levels of intensity (e.g., appearing as different levels of brightness and/or contrast) even if first, second, and third images 141-143 were emitted from the same LED. Not all of the depicted images on outer lens 140 are enumerated in FIG. 1 for clarity of illustration.

A distance between mask 120 and the second optical sheet 132 determines the depth at which the images appear with respect to outer lens 140. However, the pattern of varied-intensity light due to the varying path lengths of light through mask 120 appears as though the images are positioned at different depths with respect to outer lens 140 due to the variation in light intensity such that the images provide a 3D appearance without using an interlaced image.

As a viewer moves with respect to outer lens 140, the paths of light through mask 120 shift with respect to the viewer. As a result, an animated 3D image appears. In other words, when viewed dynamically, the image appears to move dynamically and have an appearance of 3D depth. Animated 3D image multiplier 100 may be used to produce visual effects and provide customization of different light assemblies. An advantage of animated 3D image multiplier 100 is that fewer LEDs are needed to produce a higher number of illuminations.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various FIGURE need be carried out in the specific order described.

The invention claimed is:

1. An animated 3D image multiplier, comprising:
 a light source having a plurality of lights;
 a mask disposed adjacent the light source, the mask having a plurality of holes that enable light from the light source to pass through the mask;
 a plurality of optical sheets disposed adjacent the mask, opposite the light source, for projecting light passing through the mask; and
 an outer lens disposed adjacent the plurality of optical sheets, opposite the mask, such that light projected from the plurality of optical sheets appears to be positioned at different depths with respect to the outer lens.

2. The animated 3D image multiplier of claim 1, wherein the light source comprises a plurality of light-emitting diodes.

3. The animated 3D image multiplier of claim 1, wherein the mask is separated from the light source by a predetermined gap.

4. The animated 3D image multiplier of claim 1, wherein the plurality of holes has a greater number of holes than the number of lights of the plurality of lights such that a greater number of illuminations are projected on the outer lens than the number of lights.

5. The animated 3D image multiplier of claim 1, wherein light emitted from each of the plurality of lights passes through a plurality of holes in the mask forming a pattern of varied-intensity light due to a variation in the spread of light as it passes through the plurality of holes at varying angles.

6. The animated 3D image multiplier of claim 5, wherein the pattern of varied-intensity light is projected by the plurality of optical sheets as images on the outer lens having a corresponding variation in intensity.

7. The animated 3D image multiplier of claim 6, wherein a distance between the mask and the second optical sheet determines the depth at which the pattern of varied-intensity light appears with respect to the outer lens.

8. The animated 3D image multiplier of claim 6, wherein the pattern of varied-intensity light appears as though the images are positioned at different depths with respect to the outer lens due to the variation of light intensity such that the images provide a 3D appearance without using an interlaced image.

9. The animated 3D image multiplier of claim 6, wherein the images appear to move from the perspective of a viewer who is moving dynamically with respect to the animated 3D image multiplier.

10. The animated 3D image multiplier of claim 1, wherein the plurality of optical sheets comprises a first optical sheet and a second optical sheet.

11. The animated 3D image multiplier of claim 10, wherein the first optical sheet and the second optical sheet are each a lenticular sheet having a lenticular pattern.

12. The animated 3D image multiplier of claim 11, wherein the first optical sheet and the second optical sheet are adapted to homogenize light emitted through the mask.

13. The animated 3D image multiplier of claim 11, wherein the lenticular pattern of the first optical sheet is arranged perpendicular to the lenticular pattern of the second optical sheet for homogenizing light in a first direction and a second direction, perpendicular to the first direction.

14. An animated 3D image multiplying light assembly, comprising:

a light source having a plurality of light-emitting diodes;
a mask disposed a predetermined distance from the light source, the mask having a plurality of holes adapted to allow light to pass therethrough, the plurality of holes being in greater number than a number of light-emitting diodes from the plurality of light emitting diodes;
a first lenticular sheet adjacent a second lenticular sheet for projecting light from the light source having passed through the mask, the first lenticular sheet aligned perpendicular with the second lenticular sheet for homogenizing light in a first direction and a second direction, perpendicular to the first direction; and
an outer lens positioned such that light projected from the first lenticular sheet and the second lenticular sheet appears as though positioned at different depths with respect to the outer lens thereby providing a 3D appearance, and when viewed dynamically the light projected appears to move dynamically.

\* \* \* \* \*